May 2, 1961 J. D. BARNARD 2,982,935

JACK TYPE ELECTRICAL CONNECTOR

Filed Aug. 25, 1958

INVENTOR.
JACK D. BARNARD
BY Henry H. Page
AGENT

United States Patent Office 2,982,935

Patented May 2, 1961

2,982,935

JACK TYPE ELECTRICAL CONNECTOR

Jack D. Barnard, Rochester, N.Y., assignor to General Dynamics Corporation, Rochester, N.Y., a corporation of Delaware Filed Aug. 25, 1958, Ser. No. 756,757

4 Claims. (Cl. 339—17)

My invention is concerned with jack type electrical connectors in general and particularly with jack connectors suited for connecting printed circuit conductors with lead wires or electrodes of components mounted on boards bearing those conductors and to such connectors used in boards which are to be dip soldered.

While printed circuit boards have been provided in the past equipped with plug-in type connectors for joining components mounted on the boards with conductors printed or otherwise fixed to the surface of the boards, such connectors have been of the traditional jack type, i.e., employing flexing, leaf electrode components within the jacks which put pressure on inserted electrodes or lead wires introduced within the jacks in order to achieve electrical contact between each jack and lead wire. The flexing member connectors must necessarily be miniaturized in order to meet space requirements of printed circuit board techniques, and have several disadvantages, such as non-uniformity of pressure in the flexing component from one jack to the next, and poor aging or fatigue characteristics which results in loss of contact pressure over a relatively small number of cycles of operations. These disadvantages are usually caused by the small size of the components. Further, when several flexing member type connectors are to be used to connect circuit board conductors to ones of a group of electrodes borne by a single component, where the electrodes are fixed relative to each other, such as the pins of a vacuum tube, the connectors must be accurately positioned in the board in order to insure a physical matching between the component electrodes and the connectors without interfering with the electrical contact between each jack and pin. Another disadvantage of the conventional jack type of flexing element electrode is that they are not enclosed and so tend to pick up unwanted solder during dip soldering operations carried out on the board in which they are mounted. The unwanted solder usually prevents the flexing element from functioning properly.

Accordingly, it is an object of my invention to provide a new and improved electrical connector.

Another object of my invention is to provide a new and improved electrical connector suitable for use in printed circuit boards.

Another object of my invention is to provide a new and improved jack type connector suitable for receiving pin-type plug-in units.

Another object of my invention is to provide a new and improved connector suitable for use in printed circuit boards which eliminates the necessity for locating the connector precisely within the board.

Another object of my invention is to provide a new and improved connector suitable for use in dip soldering operations.

I accomplish these and other objects as set forth in the preferred embodiment of my invention which is described below. For a better understanding of my invention, reference is made in the following description to the drawings attached to and forming a part of the present specification, and in which.

Figure 1:
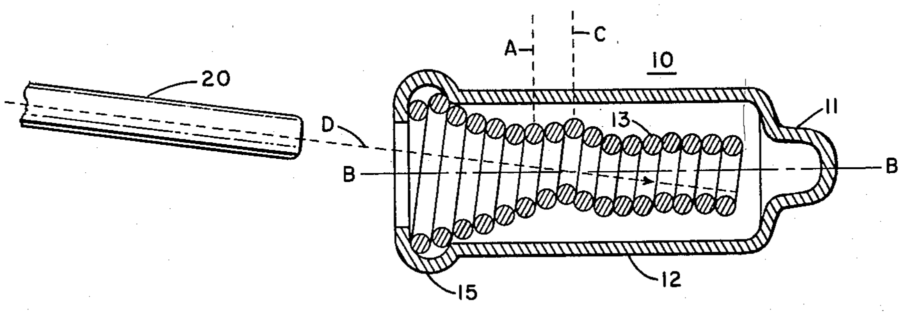
Fig. 1 shows an axial section of a connector.

Referring to Fig. 1, I provide an electrical connector including a substantially cup-shaped electrically conductive element 10 and coil spring 13. Cup element 10, which may be inexpensively formed from flat stock by a punching or other suitable process, is air- and liquid-tight. The left-hand end or lip 15 of cup element 10 is open, while the right-hand end of the cup element 10 is closed and terminates in a protruding section 11. A tubular section 12 of cup element 10 having a uniform, substantially round internal cross section slightly smaller than the cross section of lip 15 lies intermediate the open and closed ends of the element. As shown in Fig. 1, cup element 10 including tubular section 12 is symmetrical about axis B—B.

Coil spring or electrode 13, formed from wire stock of uniform thickness and located within cup element 10, is mechanically and electrically fixed at its left-hand end to lip 15 of cup element 10 by any suitable means, such as crimping lip 15 over the first few turns at the left-hand end of spring 13. Spring 13, fastened in this manner to cup element 10 at substantially a single point along its axis, normally is substantially coaxial with cup element 10 except as noted below. At its left-hand end, spring 13 has an external diameter substantially the same as the diameter of lip 15. The external diameter of spring 13 decreases along the length of spring 13 from left to right to a minimum dimension at line A. The part of spring 13 lying to the right of line A merges smoothly with and is of the same external diameter as the part of spring 13 lying immediately to the left of line A. The external diameter or cross section of the part of spring 13 lying to the right of line A is substantially smaller than the internal diameter or cross section of cup element 10, so that the part of spring 13 remote from lip 15 is free to move laterally with respect to the axis, and within the confines, of tubular section 12. In addition to being flared from lip 15 to line A, coil spring 13 is kinked at a point lying on line C within the reduced, right-hand part, i. e., spring 13 is deformed so that when spring 13 is in its normal position a part of its axis lying to the right of line A departs from axis B—B of cup element 10.

Because spring 13 is formed from wire of uniform thickness, the derived surface within spring 13 is funnel shaped, decreasing from a maximum at lip 15 to a minimum at line A and remaining substantially constant over the remaining length of spring 13. A lead or pin electrode 20 of an external element can be inserted through the open end of cup element 10 along line D which may be askew or laterally displaced with respect to axis B—B of cup element 10 and spring 13 when the latter is in normal position. Within cup element 10, pin 20 is guided by the funnel shape of the derived internal wall of spring 13, and, if it is assumed that line D along which pin 20 is advanced is other than coincident with axis B—B, the free end of spring 13 is deflected after pin 20 has been moved into physical contact with spring 13. As pin 20, which is substantially the same diameter as the minimum internal diameter of spring 13, is advanced into cup element 10, the end of pin 20 is received within the interior of the part of spring 13 lying to the right of line A. The advance of pin 20 through the kinked portion of spring 13 straightens out spring 13 and therefore causes spring 13 to press against the side of electrode 20. In this manner, electrical contact between electrode 20 and spring 13 as well as cup element 10 is insured.

Figure 2:
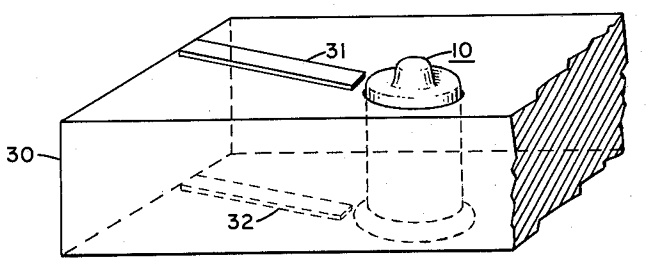
Fig. 2 shows the connector of Fig. 1 mounted in a printed circuit board.

In the above description, the connector including cup element 10 has been assumed to be unmounted. Referring to Fig. 2, the connector is suited for mounting in a printed circuit board by any suitable method, such as forcing cup element 10 through a close fitting opening passing through board 30 from its top to bottom surfaces. The axis B—B of cup element 10 is substantially normal to the surfaces of board 30 and cup 10 opens into the lower surface of board 30. Conductors, such as 31 and 32, are printed or otherwise fixed on the top and bottom surfaces, respectively, of board 30 and are to be electrically joined to cup element 10 in the manner to be described. Accordingly, cup element 10 is positioned within board 30 so that its open and closed ends emerge from the upper and lower surfaces of board 30 adjacent to conductors 31 and 32, respectively.

The electrical joining of conductors 31 and 32 with cup element 10, which are suited to receive solder, may be achieved by successively immersing the top and bottom surfaces of board 30 and the closed and open ends of cup element 10 in a solder bath in the well known manner. When the upper surface of board 30 is immersed in the bath, no solder enters the closed end of liquid-tight cup element 10. Similarly, when the lower surface of board 30 is immersed in the bath, the air entrapped in the closed interior of cup element 10 prevents the solder in the bath from entering the interior of cup element 10. Therefore, the interior of cup element 10 remains free of solder so that spring 13 also is kept free from and is not impaired by solder picked up in the dipping process.

It is now apparent that if the connector including cup element 10 and spring 13 is connected to a printed conductor on circuit board 30 in the above described manner, and an electrode thereafter is inserted through the open end of cup element 10 along a line that is other than coaxial with cup element 10 as set forth in the preceding paragraphs, spring 13 is deflected from its normal position (coaxial with cup element 10) to receive the end of the electrode. This accommodation of spring 13 allows the connector to be located or positioned in board 30 within comparatively wide limits without interfering with the ability of the connector to receive a pin electrode inserted along a line fixed relative to the board and without effectively changing the resistance of the connection between the external electrode and spring 13.

After the soldering process has been carried out, it may be desirable to open the above described closed end of cup element 10 in order to prevent a collection of moisture or other substances within cup element 10 when the board is put into use. Accordingly, projection 11 of cup element 10 which extends above the upper surface of board 30 is removed after the soldering operation has been carried out, thereby making it possible for liquids or other material to pass from one side of the board 30 to the other through cup element 10.

While I have shown and described a specific embodiment of my invention, other modifications will readily occur to those skilled in the art. I do not therefore desire my invention to be limited to the specific arrangement shown and described and I intend in the appended claims to cover all modifications within the spirit and scope of my invention.

I claim:

1. In an electrical connector, a cup-shaped, electrically conductive element having an open end and a substantially regular internal cross section, a coil spring located within and electrically connected to said element, said spring having a part remote from said open end of external cross section smaller than the internal cross section of said element and kinked at a point along its axis, and means fixing the end of said spring to the open end of said cup for locating said spring substantially coaxially with said element, whereby said spring is straightened relative to its axis and deflected relative to said element to receive and electrically connect to said element the end portion of an electrically conductive pin having a cross section substantially the same as the internal cross section of said remote spring portion and introduced within the open end of said element and the interior of said spring and advanced along a line different from the axis of said element.

2. In an electrical connector, a cup-shaped electrically conductive element having a open end and a substantially regular internal cross section, a coil spring formed from wire of substantially uniform thickness located within and electrically connected to said element, said spring having a part remote from said element open end of regular external cross section smaller than the internal cross section of said element and a part extending between said element open end and said remote spring part of external cross section decreasing from the internal cross section of said element at a point adjacent to said open end to the external cross section of said remote end, and means fixing the end of said spring adjacent to said element open end for positioning said spring substantially coaxially with said element, whereby the surface derived within said spring is funnel shaped and therefore effective for guiding and receiving the end portion of an electrically conductive pin introduced through said element open end and the interior of said spring and advanced within said element along a line different from the axis of said element, and having in addition a kinked portion of said spring within said part remote from said open end whereby said remote part of said spring is straightened relative to itself as the end of the pin is advanced within the interior of said remote spring part.

3. An electrical assembly comprising a board of insulating material having first and second surfaces, an electrical conductor fixed to one of said surfaces, a connector including an electrically conductive cup-shaped element of substantially regular internal cross section and a coil spring located therein, said cup-shaped element being air- and liquid-tight and passing through and fixed to said board adjacent to said conductor, said spring being formed from wire of substantially uniform thickness and having a part remote from said element open end of regular external cross section smaller than the internal cross section of said element and a part extending between said element open end and said remote spring part of external cross section decreasing from the internal cross section of said element at a point adjacent to said open end to the external cross section of said remote end, and means fixing the end of said spring adjacent to said element open end for positioning said spring substantially coaxially with said element whereby the surface derived within said spring is funnel shaped and therefore effective for guiding and receiving the end portion of an electrically conductive pin introduced through said element open end and advanced within said element and the interior of said remote spring end along a line different from the axis of said element, and either surface of said board may be dip soldered in order to electrically join said element and said conductor without admitting solder to the interior of said element or into contact with said spring.

4. The electrical assembly set forth in claim 3, and having in addition a portion within the remote part of said spring kinked with respect to the axis of said spring, whereby said remote spring part is straightened along its length as the pin end is advanced within the interior of said remote spring part.

References Cited in the file of this patent

UNITED STATES PATENTS

| | | |
|---|---|---|
| 1,657,253 | Fortin | Jan. 24, 1928 |
| 1,946,889 | Wessel | Feb. 13, 1934 |
| 2,391,425 | Korn | Dec. 25, 1945 |
| 2,427,001 | Hubbell et al. | Sept. 9, 1947 |
| 2,644,883 | Schoenherr | July 7, 1953 |
| 2,718,625 | Harrison | Sept. 20, 1955 |

FOREIGN PATENTS

| | | |
|---|---|---|
| 1,013,561 | France | Apr. 30, 1952 |